United States Patent
Hwang et al.

(10) Patent No.: US 8,861,805 B2
(45) Date of Patent: Oct. 14, 2014

(54) FACE RECOGNITION APPARATUS AND METHOD FOR CONTROLLING THE SAME

(71) Applicant: Samsung Electronics Co., Ltd., Suwon-si (KR)

(72) Inventors: Won Jun Hwang, Seoul (KR); Kyung Shik Roh, Seongnam-si (KR); Young Bo Shim, Seoul (KR); Suk June Yoon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 163 days.

(21) Appl. No.: 13/666,168

(22) Filed: Nov. 1, 2012

(65) Prior Publication Data
US 2013/0108123 A1    May 2, 2013

(30) Foreign Application Priority Data
Nov. 1, 2011    (KR) .......................... 10-2011-0112999

(51) Int. Cl.
*G06K 9/00* (2006.01)
*G06K 9/46* (2006.01)
*G06K 9/62* (2006.01)

(52) U.S. Cl.
CPC .......... *G06K 9/00268* (2013.01); *G06K 9/4619* (2013.01); *G06K 9/6297* (2013.01); *G06K 9/00288* (2013.01)
USPC ............................ 382/118; 382/115; 382/116

(58) Field of Classification Search
None
See application file for complete search history.

(56) References Cited

U.S. PATENT DOCUMENTS

| | | | | |
|---|---|---|---|---|
| 5,842,194 A | * | 11/1998 | Arbuckle | .......................... 706/52 |
| 6,184,926 B1 | * | 2/2001 | Khosravi et al. | .............. 348/239 |
| 7,224,835 B2 | * | 5/2007 | Maeda et al. | .................. 382/218 |
| 7,505,621 B1 | * | 3/2009 | Agrawal et al. | ............... 382/159 |
| 7,783,135 B2 | * | 8/2010 | Gokturk et al. | ............... 382/305 |
| 8,085,982 B1 | * | 12/2011 | Kim et al. | ...................... 382/103 |

(Continued)

FOREIGN PATENT DOCUMENTS

| | | | |
|---|---|---|---|
| EP | 2590111 A2 | * | 5/2013 |
| JP | 2008-533606 | | 8/2008 |

(Continued)

OTHER PUBLICATIONS

Wang et al., Bayesian Face Recognition Based on Markov Random Field Modeling, 2009, M. Tistarelli and M.S. Nixon (Eds.): ICB 2009, LNCS 5558, pp. 42-51.*

(Continued)

*Primary Examiner* — Randolph I Chu
(74) *Attorney, Agent, or Firm* — Staas & Halsey LLP

(57) ABSTRACT

A face recognition apparatus and face recognition method perform face recognition of a face by comparing an image of the face to be identified with target images for identification. The face recognition apparatus includes an image input unit to receive an image of a face to be identified, a sub-image production unit to produce a plurality of sub-images of the input face image using a plurality of different face models, a storage unit to store a plurality of target images, and a face recognition unit to set the sub-images to observed nodes of a Markov network, to set the target images to hidden nodes of the Markov network, and to recognize the presence of a target image corresponding to the face images to be identified using a first relationship between the observed nodes and the hidden nodes and a second relationship between the hidden nodes.

23 Claims, 13 Drawing Sheets

(56) References Cited

U.S. PATENT DOCUMENTS

| | | | |
|---|---|---|---|
| 8,379,937 B1* | 2/2013 | Moon et al. | 382/118 |
| 8,488,023 B2* | 7/2013 | Bacivarov et al. | 348/239 |
| 8,620,066 B2* | 12/2013 | Kozakaya et al. | 382/154 |
| 2003/0161504 A1* | 8/2003 | Inoue | 382/115 |
| 2003/0169908 A1* | 9/2003 | Kim et al. | 382/118 |
| 2003/0212552 A1* | 11/2003 | Liang et al. | 704/231 |
| 2004/0002863 A1* | 1/2004 | Nefian | 704/256 |
| 2005/0047664 A1* | 3/2005 | Nefian et al. | 382/228 |
| 2005/0105778 A1* | 5/2005 | Sung et al. | 382/115 |
| 2006/0204060 A1* | 9/2006 | Huang et al. | 382/118 |
| 2007/0064979 A1* | 3/2007 | Chhibber et al. | 382/118 |
| 2009/0003709 A1* | 1/2009 | Kaneda et al. | 382/190 |
| 2009/0135188 A1* | 5/2009 | Ding et al. | 345/473 |
| 2009/0285456 A1* | 11/2009 | Moon et al. | 382/118 |
| 2010/0034427 A1* | 2/2010 | Fujimura et al. | 382/106 |
| 2010/0086215 A1* | 4/2010 | Bartlett et al. | 382/197 |
| 2010/0119157 A1* | 5/2010 | Kameyama | 382/195 |
| 2010/0158319 A1* | 6/2010 | Jung et al. | 382/106 |
| 2010/0172551 A1* | 7/2010 | Gilley et al. | 382/118 |
| 2010/0332229 A1* | 12/2010 | Aoyama et al. | 704/251 |
| 2011/0265110 A1* | 10/2011 | Weinblatt | 725/12 |
| 2012/0140091 A1* | 6/2012 | Irmatov et al. | 348/222.1 |
| 2012/0155718 A1* | 6/2012 | Hwang et al. | 382/118 |
| 2012/0281079 A1* | 11/2012 | Chhibber et al. | 348/77 |
| 2013/0015946 A1* | 1/2013 | Lau et al. | 340/5.2 |
| 2013/0035979 A1* | 2/2013 | Tenbrock | 705/7.29 |
| 2013/0121589 A1* | 5/2013 | Gokturk et al. | 382/195 |

FOREIGN PATENT DOCUMENTS

| | | | |
|---|---|---|---|
| JP | 2009187130 A | * | 8/2009 |
| KR | 10-2002-0057522 | | 7/2002 |
| KR | 20020089295 | * | 11/2002 |
| KR | 10-2009-0050199 | | 5/2009 |
| KR | 10-2010-0102949 | | 9/2010 |
| KR | 10-2012-0069922 | | 6/2012 |
| KR | 20130048076 | * | 5/2013 |
| WO | WO 0239371 A2 | * | 5/2002 |

OTHER PUBLICATIONS

Nefian, Embedded Bayesian Networks for Face Recognition, 2002, Multimedia and Expo, 2002. ICME '02. Proceedings. 2002 IEEE International Conference, pp. 133-136.*

Kim et al., Face recognition using the embedded HMM with second-order block-specifc observations, 2003, Pattern Recognition Society, pp. 2724-2735.*

Tang et al., Face Sketch Synthesis and Recognition, 2003, Proceedings of the Ninth IEEE International Conference on Computer Vision.*

Cardinaux et al., Face Verification Using Adapted Generative Models, 2004, Proceedings of the Sixth IEEE International Conference on Automatic Face and Gesture Recognition.*

Salah et al., Hidden Markov Model-based face recognition using selective attention, 2007, Proc. SPIE 6492, Human Vision and Electronic Imaging XII.*

Nefian et all., Hidden Markov Models for Face Recognition, 1998, Proc. International Conf. on Acoustics, Speech and Signal Processing.*

Zhou et al. Real-time Facial Expression Recognition in the Interactive Game Based on Embedded Hidden Markov Model, 2004,Proceedings of the International Conference on Computer Graphics, Imaging and Visualization.*

Extended European Search Report dated Mar. 28, 2014 from European Patent Application No. 12190972.5, 9 pages.

J.M.H du Buf, "Chapter 9: From semantic texture attributes to a syntactic analysis in Gabor space", Jan. 1, 2006, Visual Search (2), Taylor and Francis, XP002721492, pp. 139-140.

Norbert Krüger et al., "Chapter 9: Principles of Cortical Processing Applied to and Motivated by Artificial Object Recognition", Jan. 1, 2000, XP008168237, pp. 164-179, 23 pages.

Rui Huang et al., "A Hybrid Face Recognition Method using Markov Random Fields", Proceedings of the 17$^{th}$ International Conference on Pattern Recognition, Aug. 23, 2004, vol. 3, 4 pages.

Xiaogang Wang et al., "Face Photo-Sketch Synthesis and Recognition", IEEE Transactions on Pattern Analysis and Machine Intelligence, vol. 31, No. 11, Nov. 1, 2009, pp. 1955-1967.

Rui Wang et al., "Bayesian Face Recognition Based on Markov Random Field Modeling", Center for Biometrics and Security Research, Jun. 2, 2009, pp. 42-51.

* cited by examiner

FIG. 10
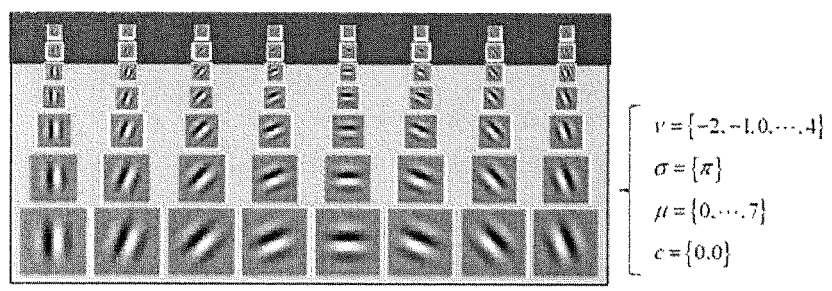
(A)
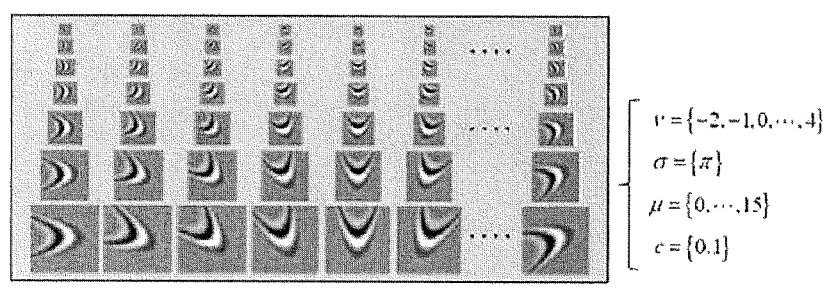
(B)

FACE RECOGNITION APPARATUS AND METHOD FOR CONTROLLING THE SAME

CROSS-REFERENCE TO RELATED APPLICATIONS

This application claims the priority benefit of Korean Patent Application No. 10-2011-0112999, filed on Nov. 1, 2011, in the Korean Intellectual Property Office, the disclosure of which is incorporated herein by reference.

BACKGROUND

1. Field

Embodiments disclosed herein relate to a face recognition apparatus for recognizing a face by comparing an image of the face to be identified with target images for identification and a method for controlling the same.

2. Description of the Related Art

As modern society has become an advanced information-oriented society, information security and identification are increasingly important.

Conventionally, keys, passwords, ID cards, smart cards and the like are used for information security and identification. However, these tools have numerous disadvantages. They may be difficult to carry, and may be lost. Further, they may be counterfeited, falsified, or pirated. In order to solve these problems, information security and identification using biometric recognition have been developed.

Biometric recognition carries out identification through recognition of a part of the human body and may include fingerprint recognition, iris recognition, voice recognition, signature recognition, face recognition and the like. Such biometric recognition is very convenient and secure, since it uses inherent body parts, and research associated therewith is actively underway.

Among biometric recognition techniques, face recognition is regarded to be one of the most convenient and competitive, since it advantageously enables identification of a subject in a non-contact manner without voluntary agreement of the subject, unlike recognition techniques requiring a specific operation or task of a user, such as fingerprint recognition and iris recognition.

Face recognition may utilize a multimedia database search key technique, which is actively being developed and researched in a variety of applications using face information such as summarization of movies, identification, human computer interface (HCI) image search, security, and surveillance systems.

However, the results of face recognition greatly depend on internal environmental variations such as identity, age, race, expression and accessories worn, and external environmental variations such as pose, exterior illumination and image process.

That is, when one kind of feature analysis is used for face recognition, recognition performance is changed depending on environmental variations. Accordingly, there is a need for face recognition methods that are resistant to environmental variation.

SUMMARY

Additional aspects and/or advantages will be set forth in part in the description which follows and, in part, will be apparent from the description, or may be learned by practice of the invention.

Therefore, it is an aspect of the present invention to provide a face recognition apparatus and a method for controlling the same, performing face recognition while taking into consideration a relationship between hidden nodes, that is, a similarity between target images, using a Markov network, to improve the accuracy of face recognition results.

In accordance with one aspect of the present invention, provided is a face recognition apparatus including: an image input unit to receive an image of a face to be identified; a sub-image production unit to produce a plurality of sub-images of the input face image using a plurality of different face models; a storage unit to store a plurality of target images; and a face recognition unit to set the sub-images to observed nodes of a Markov network, to set the target images to hidden nodes of the Markov network using the Markov network, and to recognize presence of target image corresponding to the face images to be identified using a first relationship between the observed node and the hidden node and a second relationship between the hidden nodes.

The first relationship between the observed node and the hidden node may be based on a similarity between the sub-image and the target image, and the second relationship between the hidden nodes may be based on a similarity between the target images.

The face recognition unit may include: a first calculation unit to calculate a first similarity between the respective sub-images produced in the sub-image production unit and the target images stored in the storage unit and to array the target images in order of similarity; and a second calculation unit to calculate a second similarity between target images arrayed with respect to one sub-image among the sub-images, and target images arrayed with respect to one or more other sub-images among the sub-images.

The second calculation unit may calculate the second similarity with respect to all sub-images produced by the sub-image production unit.

The first calculation unit may calculate the first relationship in accordance with the following Equation 2:

$$\phi_i(x_i, y_i) = \exp(-|s_i(x_i, y_i) - 1|^2 / 2\sigma^2) \qquad \text{[Equation 2]}$$

wherein xi and yi are a target image i and a sub-image i, respectively, $\phi(xi, yi)$ is a vector function representing a first relationship between the sub-image i and the target image i, s(xi, yi) represents a first similarity between the target image i and the sub-image i, and σ represents a noise parameter.

The second calculation unit may calculate the second relationship in accordance with the following Equation 5:

$$\psi_{ij}(x_i, x_j) = \exp(-|s_{ij}(x_i, x_j) - 1|^2 / 2\sigma^2) \qquad \text{[Equation 5]}$$

wherein xi and xj are a target image i and a target image j, respectively, $\psi(xi, xj)$ is a matrix function representing a second relationship between the target image i and the target image j, s(xi, xj) represents a second similarity between the target image i and the target image j, and σ represents a noise parameter.

The face recognition apparatus may further include: an identification unit to detect the target image corresponding to the face image to be identified by applying a belief propagation algorithm to the first relationship and the second relationship.

The identification unit may calculate a marginal probability based on the application result of the belief propagation algorithm and the first relationship, and may detect the target image corresponding to the face image to be identified based on the calculated marginal probability.

In accordance with another aspect of the present invention, provided is a method for controlling a face recognition apparatus including: inputting a face image to be identified; producing a plurality of sub-images of the input face image using a plurality of different face models; setting the sub-images to observed nodes of a Markov network and setting the target images to hidden nodes of the Markov network using the Markov network; and recognizing a target image corresponding to the face image to be identified using a first relationship between the observed node and the hidden node and a second relationship between the hidden nodes.

The first relationship between the observed node and the hidden node may be based on a similarity between the sub-image and the target image, and the second relationship between the hidden nodes may be based on a similarity between the target images.

The recognizing a target image corresponding to the face image to be identified may include: calculating a first similarity between the respective sub-images produced in the sub-image production unit and the target images stored in the storage unit and arraying the target images in order of first similarity; and calculating a second similarity between target images arrayed with respect to one sub-image among the sub-images, and target images arrayed with respect to other sub-image among the sub-images.

The second similarity may be calculated for all of the produced sub-images.

The first relationship may be calculated in accordance with the following Equation 2:

$$\phi_i(x_i,y_i)=\exp(-|s_i(x_i,y_i)-1|^2/2\sigma^2) \quad \text{[Equation 2]}$$

wherein xi and yi are a target image i and a sub-image i, respectively, φ(xi, yi) is a vector function representing a first relationship between the sub-image i and the target image i, s(xi, yi) represents a first similarity between the target image i and the sub-image i, and σ represents a noise parameter.

The second relationship may be calculated in accordance with the following Equation 5:

$$\psi_{ij}(x_i,x_j)=\exp(-|s_{ij}(x_i,x_j)-1|^2/2\sigma^2) \quad \text{[Equation 5]}$$

wherein xi and xj are a target image i and a target image j, respectively, ψ(xi,xj) is a matrix function representing a second relationship between the target image i and the target image j, s(xi, xj) represents a second similarity between the target image i and the target image j, and σ represents a noise parameter.

The recognizing a target image corresponding to the face image to be identified may be carried out by recognizing presence of a target image corresponding to the face image to be identified by applying a belief propagation algorithm to the first relationship and the second relationship.

The recognizing a target image corresponding to the face image to be identified may be carried out by calculating a marginal probability based on the application result of the belief propagation algorithm and the first relationship, and recognizing presence of a target image corresponding to the face image to be identified, based on the calculated marginal probability.

In accordance with another aspect of the present invention, provided is a face recognition apparatus including: an image input unit to receive an image; a sub-image production unit to produce a plurality of sub-images of the input image using a plurality of models; a feature extraction unit to receive the plurality of sub-images generated by the sub-image production unit and to extract a feature from each of the plurality of sub-images; and a recognition unit to set the sub-images to observed nodes of a Markov network, to set target images to hidden nodes of the Markov network using the Markov network, and to recognize the presence of a target image corresponding to the image to be identified by using the extracted features to determine a first relationship between the observed nodes and the hidden nodes and by determining a second relationship between the hidden nodes.

The feature extraction unit may include a plurality of extraction units which correspond to the plurality of sub-images, wherein each extraction unit may include at least one Gabor filter to obtain a plurality of features and a linear discriminant analyzer to perform linear discriminant analysis on the obtained features to calculate a feature vector.

Each Gabor filter may obtain a plurality of features using an I-type extended curvature Gabor filter group using at least one parameter from among parameters including orientation, scale, Gaussian width, or curvature ratio. The I-type extended curvature Gabor filter group may include a plurality of I-type curvature Gabor filters, wherein a sub-set of I-type curvature Gabor filters may be selected from among the plurality of I-type curvature Gabor filters, and filtering may be performed using the selected sub-set of I-type curvature Gabor filters.

BRIEF DESCRIPTION OF THE DRAWINGS

These and/or other aspects of the invention will become apparent and more readily appreciated from the following description of the embodiments, taken in conjunction with the accompanying drawings of which:

FIG. 10 parts (A) and (B) illustrate an example of features of a curvature Gabor filter;

DETAILED DESCRIPTION

Figure 1:
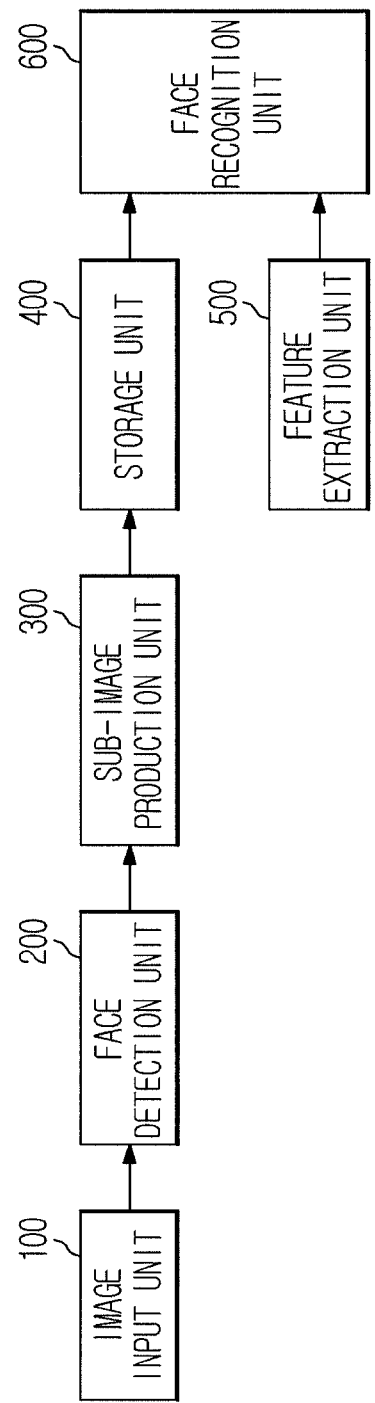
FIG. 1 is a block diagram illustrating a controlled configuration of a face recognition apparatus according to one embodiment of the present invention.

Reference will now be made in detail to the embodiments of the present invention, examples of which are illustrated in the accompanying drawings, wherein like reference numerals refer to like elements throughout.

FIG. 1 is a block diagram illustrating a controlled configuration of a face recognition apparatus according to one embodiment of the present invention.

Referring to FIG. 1, the face recognition apparatus according to one embodiment of the present invention includes an image input unit 100 to receive an image including a face to be identified, and a face detection unit 200 to subject the image including the face to pre-processing and to thereby detect a first face image. The face recognition apparatus further includes a sub-image production unit 300 to produce a plurality of sub-images of the input face image using a plurality of different face models, a storage unit 400 to store a plurality of target images, a feature extraction unit 500 to extract face features from the sub-image, and a face recognition unit 600. The face recognition unit may set the sub-images to observed nodes of a Markov network, set the target images to hidden nodes of the Markov network using the Markov network, and thereby recognizes target images corresponding to the face images to be identified using a first relationship between the observed node and the hidden node and a second relationship between the hidden nodes.

The image input unit 100 obtains a face image of a subject in need of face recognition or identification through an image acquisition apparatus (not shown) for example, a camera or camcorder. The image acquisition apparatus may be included in the image input unit 100 or may be external to the image input unit 100, in which case the image may be provided to the image input unit 100 by the image acquisition apparatus or from another external source. For example, the image input unit 100 may obtain a face image of a subject in need of face recognition through a wired or wireless network or from a medium, for example, hard disks, floppy disks, flash memory or memory card (e.g., a USB drive), or optical media such as CD ROM discs and DVDs.

The image input unit 100 may obtain an image of the subject using light, which includes a light condenser (not shown) to condense light, an imaging unit (not shown) to sense the condensed light and convert a signal of the sensed light into an electric signal and an A/D convertor (not shown) that converts the electric signal into a digital signal.

The imaging unit may perform functions such as exposure, gamma, gain control, white balance and color matrix and may be implemented by an imaging sensor such as a charge coupled device (CCD) or complementary metal oxide semiconductor (CMOS).

The face detection unit 200 removes a surrounding region (e.g., a background portion) from the input image transmitted from the image input unit 100, detects specific components in the face, detects a first face image (M), based on the specific components in the face region, detects one or more eyes from the detected first face image and acquires coordinates of the one or more eyes disposed in the first face image.

The face detection unit 200 filters face images through a Gaussian lowpass filter to thereby remove noise and such a face image may be normalized, for example, to 60*80 pixels, based on the coordinates of the eye. That is, the face image resolution may be reduced from a high-resolution image to a relatively lower resolution image through a normalization process.

For example, when feature nodes are detected, there may be a difference in a detection time of about 2.6 times between a feature node detection time for an image having 120×160 pixels (high resolution) as compared to a feature node detection time for an image having 60×80 pixels (low resolution). For this reason, using face images with 60×80 pixels (low resolution), it may be possible to reduce a feature extraction time during detection of feature nodes.

The face detection unit 200 performs pre-processing required for feature analysis of the first face image.

More specifically, the input image input from the image input unit 100 may have a high or low brightness due to effects of illumination and one input image may have high-brightness parts and low-brightness parts. The effects of illumination may act as an obstacle in extracting features of the first face image.

Accordingly, the face detection unit 200 analyzes brightness distribution of respective pixels in the first face image to obtain a histogram in order to reduce effects of illumination and performs pre-processing in which a histogram is flattened, based on a predominant brightness.

The sub-image production unit 300 produces a plurality of second face images by applying a plurality of different face models to the first face image (M).

There is no limitation as to the face models that may be applied to the present invention. In one example embodiment, the distance between two eyes is calculated based on the coordinates of one or more eyes, the distance between two eyes is adjusted, and an interior face model, compensated face model, and exterior face model that have an identical size, but have different feature analysis ranges, are applied. The disclosure is not limited to the previously mentioned face models however, and other face models may be applied. Further, facial landmarks other than the eyes may be utilized, for example, positions of other facial landmarks such as the nose, mouth, ears, and the like, may be used.

The second face image may include a first sub-image S1, a second sub-image S2, and a third sub-image S3, which will be described with reference to FIG. 2. However, the disclosure is not limited to the second face image including three sub-images. One of ordinary skill in the art would understand that the second face image may include more or less than three sub-images, which may depend on the number of face models applied to the input image.

Figure 2:
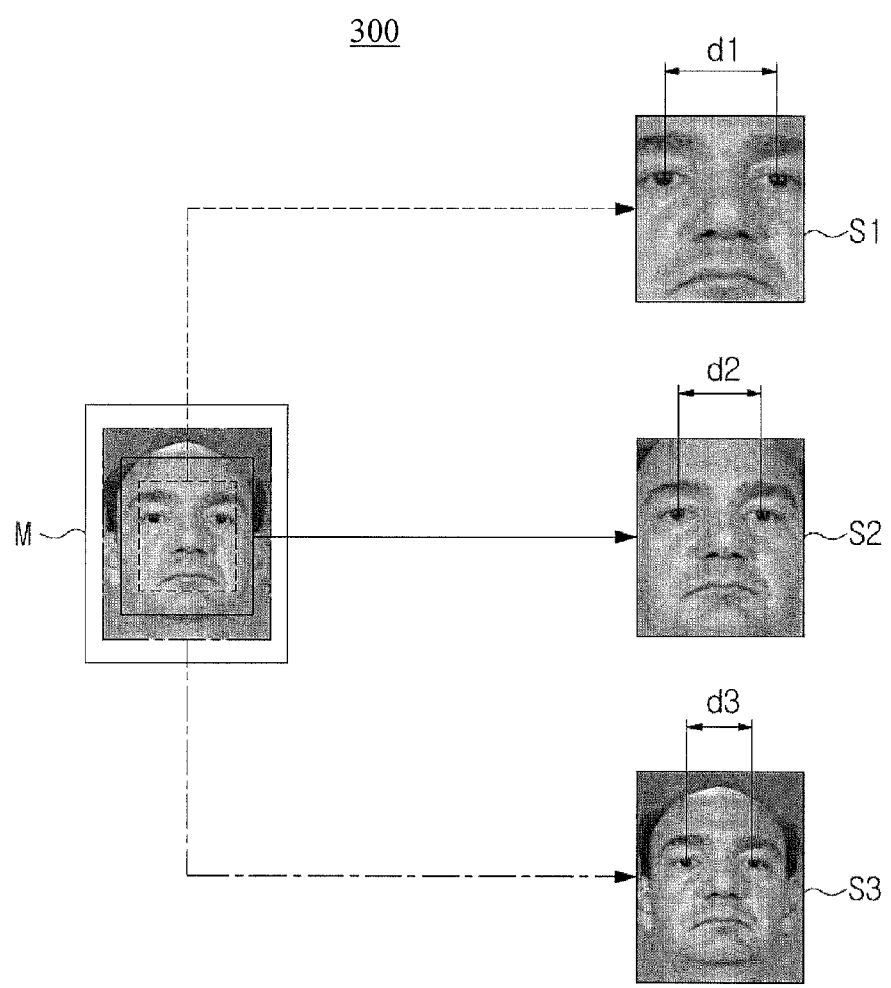
FIG. 2 is a view illustrating an example of a second face image produced in the sub-image image production unit 300.

FIG. 2 is a view illustrating an example of a second face image produced in the sub-image image production unit 300.

As shown in FIG. 2, the sub-image image production unit 300 produces a first sub-image S1 having the distance d1 between two eyes, a second sub-image S2 having the distance d2 between two eyes, and a third sub-image S3 having the distance d3 between two eyes.

The distances d1, d2 and d3 between two eyes may be previously stored, d1 may be longer than d2, and d2 may be longer than d3. Further, the sub-images may be stored in a predetermined order, for example, by storing the sub-images according to the distance between the eyes. For example, the sub-images may be stored in order from a largest distance between the eyes to the smallest distance between the eyes, or may be stored in a reverse order. The sub-images and distances may be stored in storage unit 400, for example.

The first sub-image S1 is an interior face model, which is an image to analyze interior features of the face such as the eyes, nose and mouth.

The second sub-image S2 is a compensated face model in which an interior face model is combined with an exterior face model, which is an image to analyze mostly interior features of the face. The second sub-image S2 does not include excessive head information or surrounding information and mostly includes interior components for which to stably analyze features.

The third sub-image S3 is an exterior face model, which is an image to analyze features of the face based on face periphery components such as hairstyle, ears and jaws.

The sub-image image production unit 300 reduces effects derived from variations of surroundings of an input image (e.g., a hairstyle) and produces a suitably analyzable face image including the overall features of the face such as eyebrows, eyes, nose, and lip features, by way of example.

The storage unit 400 may include a database in which information associated with the face image of each individual that belongs to groups in need of identification is stored.

The storage unit 400 may store a plurality of face image information including various facial expressions, angles and brightness in order to improve efficiency of face recognition. The plurality of face images may be stored in the storage unit 400 after pre-processing. While it is disclosed that the storage unit 400 may store a plurality of target images, the disclosure is not so limited. The face recognition apparatus may obtain target images from a source other than the storage unit, external to the face recognition apparatus. For example, target images may be obtained from an external source. For example, the face recognition apparatus may obtain target images through a wired or wireless network. The storage unit 400, which is internal to the face recognition apparatus, may also be embodied as a non-transitory computer readable medium, including hard disks, floppy disks, flash memory or memory cards (e.g., a USB drive), or optical media such as CD ROM discs and DVDs.

The pre-processing aims to reduce dispersion of illumination after removing surrounding regions and adjusting the sizes of images based on the position of eyes. Also, the face images may be stored after they are filtered through a Gaussian lowpass filter to remove noise.

The face images stored in the storage unit 400 may be normalized to, for example, to 60*80 pixels and a plurality of sub-images may be stored based on the position of eyes, and/or using positional information regarding other facial landmarks. Further, the plurality of sub-images may be stored according to whether the sub-images was obtained via a particular face-model. That is, by way of example, a sub-image may be stored separately according to whether the sub-image was obtained by applying an interior face model, compensated face model, or exterior face model.

The feature extraction unit 500 extracts respective features of a plurality of second face images produced by the sub-image production unit 300. In one embodiment, curve Gabor filtering and linear discriminant analysis (LDA) are performed to produce a plurality of features of respective second face images to thereby extract features of the sub-images. A detailed description thereof will be described below.

The face recognition unit 600 sets the plurality of sub-images to observed nodes of a Markov network using the Markov network and sets a plurality of target images to hidden nodes of the Markov network. Also, target images corresponding to face images to be identified are recognized using a first relationship between the observed node and the hidden node and a second relationship between the hidden nodes.

Figure 3:
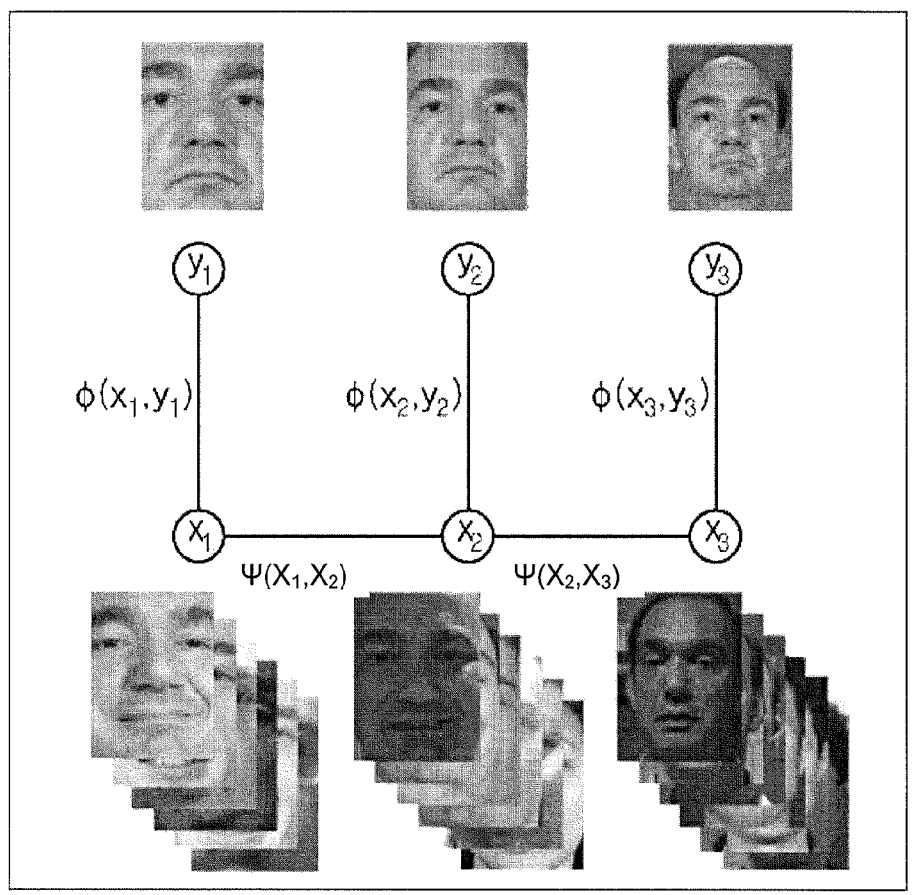
FIG. 3 is a schematic view illustrating a face recognition process using a Markov network according to one embodiment of the present invention.

FIG. 3 is a schematic view illustrating a face recognition process using a Markov network according to one embodiment of the present invention.

Referring to FIG. 3, an observed node of the Markov network is represented by y and a hidden node is represented by x. As described in FIG. 2, when an interior face model, compensated face model and exterior face model are used as face models for production of a plurality of sub-images, a first sub-image S1, a second sub-image S2, and a third sub-image S3 representing face models, respectively, are input to three observed nodes y1, y2 and y3.

Also, the face recognition unit 600 compares the target images stored in the storage unit 400 with respective sub-images (S1, S2, S3) and arrays the target images in hidden nodes ($x_1$, $x_2$, $x_3$) in order of similarity to the sub-image. That is, target images similar to the first sub-image are arrayed in the hidden node $x_1$ in order of similarity, target images similar to the second sub-image are arrayed in the hidden node $x_2$ in order of similarity, and target images similar to the third sub-image are arrayed in the hidden node $x_3$ in order of similarity. For example, target images may be arrayed in an order from the highest degree of similarity to the respective sub-image, to the lowest degree of similarity to the respective sub-image.

The observed node and the hidden node represented by a circle are connected to each other through a line, and each line refers to a statistical dependency namely, a relationship, between the nodes.

For example $\phi(x_1, y_1)$ represents a relationship between the observed node $y_1$ and the hidden node $x_1$, $\phi(x_2, y_2)$ represents a relationship between the observed node $y_2$ and the hidden node $x_2$, and $\phi(x_3, y_3)$ represents a relationship between the observed node $y_3$ and the hidden node $x_3$.

Further, $\psi(x_1, x_2)$ represents a relationship between the hidden node $x_1$ and the hidden node $x_2$, and $\psi(x_2, x_3)$ represents a relationship between the hidden node $x_2$ and the hidden node $x_3$. In the present embodiment, in order to reflect the relationships between target images, face recognition is performed while taking into consideration $\phi(x_1, y_1)$, $\phi(x_2, y_2)$ and $\phi(x_3, y_3)$ as well as $\psi(x_1, x_2)$ and $\psi(x_2, x_3)$.

Hereinafter, detailed operation of the face recognition unit 600 will be described with reference to FIGS. 4 to 7.

Figure 4:
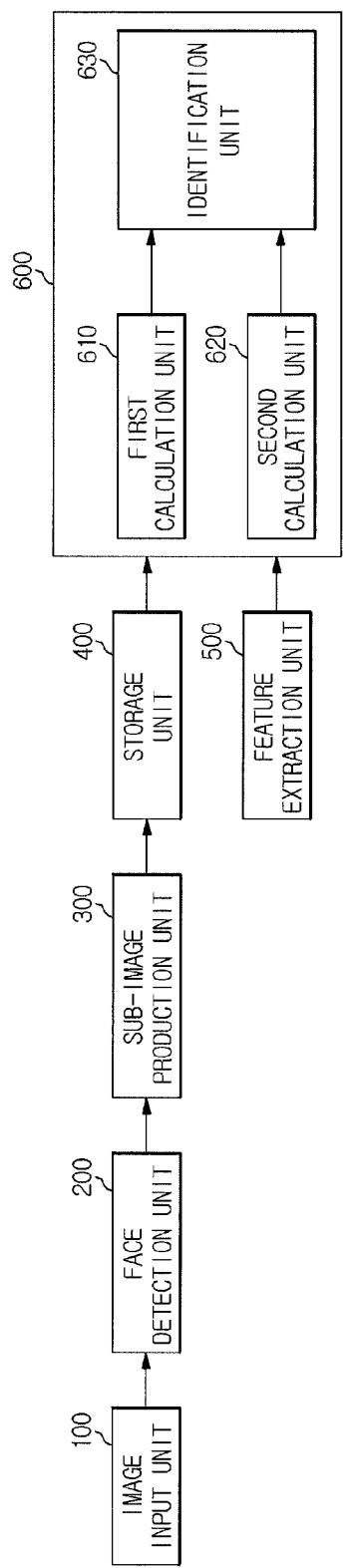
FIG. 4 is a block diagram illustrating a controlled configuration of a face recognition unit in a face recognition apparatus according to one embodiment of the present invention.

FIG. 4 is a block diagram illustrating a controlled configuration of a face recognition apparatus according to one embodiment of the present invention.

Here, a description of the image input unit 100, the face detection unit 200, the sub-image production unit 300, the storage unit 400 and the feature extraction unit 500 described in FIG. 2 are omitted for the sake of brevity.

The face recognition unit 600 includes a first calculation unit 610 to calculate a similarity (first similarity) between the sub-image and the target images, and a second calculation unit 620 to calculate a similarity (second similarity) between the target images. The face recognition unit 600 further includes an identification unit 630 to determine whether target images corresponding to face images of a subject in need of identification are present, based on calculation results of the first calculation unit and the second calculation unit, to thereby perform identification of the subject.

Figure 5:
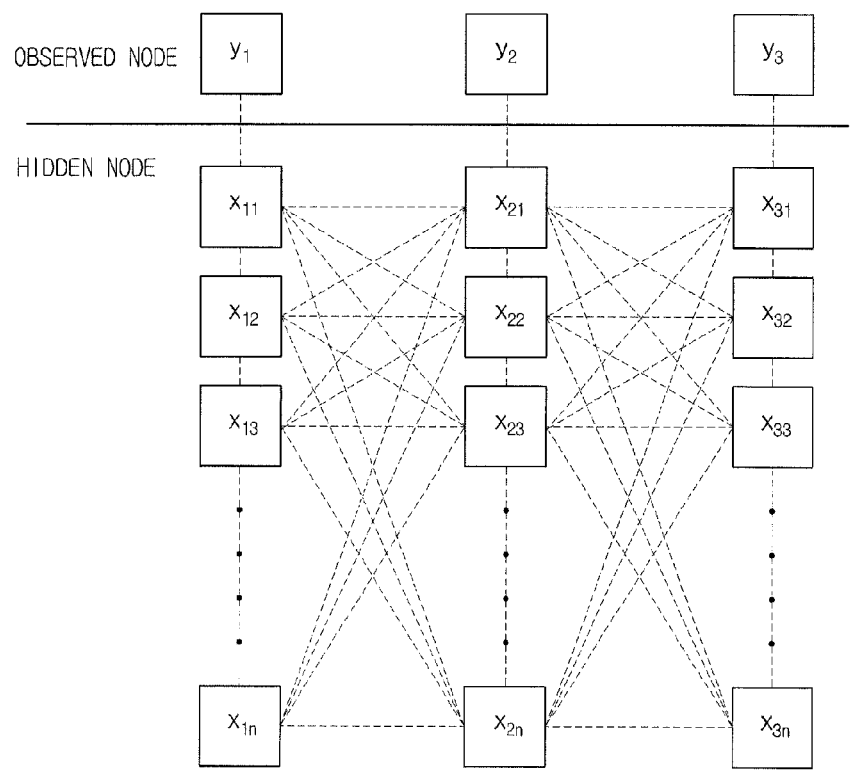
FIG. 5 is a schematic view illustrating a relationship between observed nodes corresponding to sub-images and hidden nodes corresponding to target images.

FIG. 5 is a schematic view illustrating a relationship between observed nodes corresponding to sub-images and hidden nodes corresponding to target images.

In respective observed nodes ($y_1$, $y_2$, $y_3$), hidden nodes ($x_1$, $x_2$, $x_3$) corresponding thereto are arrayed. Assuming that the number of target images stored in the storage unit 400 is n, target images are arrayed in hidden nodes $x_{11}$ to $x_{1n}$ corresponding to the observed node $y_1$ and the target images corresponding to the remaining observed nodes $y_2$ and $y_3$ are similarly arrayed.

Also, as shown in FIG. 5, the hidden nodes arrayed with respect to each observed node mutually affect adjacent hidden nodes. For example, the hidden node $x_{11}$ is affected by all hidden nodes $x_{21}$ to $x_{2n}$. However, hidden nodes arrayed with respect to the observed node $y_1$ do not mutually affect hidden nodes arrayed with respect to the observed node $y_3$.

Referring to FIG. 4, the first calculation unit 610 calculates a first similarity between sub-images and target images in accordance with the following Equation 1:

$$s_i(x_i, y_i) = \Sigma_k f_k^{x_i} \cdot f_k^{y_i} / \|f^{x_i}\| \cdot \|f^{y_i}\|.$$ [Equation 1]

wherein $s_i(x_i, y_i)$ is a function representing a first similarity and f is a feature vector representing a feature of the corresponding image.

Also, the first calculation unit 610 calculates a first similarity between observed node and hidden node in accordance with the following Equation 2:

$$\phi_i(x_i, y_i) = \exp(-|s_i(x_i, y_i) - 1|^2 / 2\sigma^2) \quad \text{[Equation 2]}$$

wherein $\sigma$ is a noise parameter, $s_i(x_i, y_i)$ is a function representing a first similarity and $\phi_i(x_i, y_i)$ is an n-dimensional vector. As described above, target images corresponding to respective sub-images are arrayed in hidden nodes corresponding to respective observed nodes in order of similarity to the sub-images. The first calculation unit 610 calculates a first similarity, and the array is also implemented by the first calculation unit. The calculation and array of the first similarity from respective sub-images are implemented on all n target images stored in the storage unit 400. Accordingly, n target images are arrayed with respect to the first sub-image, n target images are arrayed with respect to the second sub-image, and n target images are arrayed with respect to the third sub-image.

The second calculation unit 620 calculates a second similarity between target images in accordance with the following Equation 3:

$$s_{ij}(x_i^l, x_j^r) = \sum_k f_k^{x_{ij}^l} \cdot f_k^{x_{ij}^r} / \|f^{x_{ij}^l}\| \cdot \|f^{x_{ij}^r}\| \quad \text{[Equation 3]}$$

wherein $x_i^l$ represents the $l^{th}$ target image of hidden node i, and $x_j^r$ represents the $r^{th}$ target image of hidden node j. $f^{x_{ij}^l}$ is a concatenated feature matrix representing a feature of the $l^{th}$ target image of hidden node l, j, and $f^{x_{ij}^r}$ is a concatenated feature matrix representing a feature of the $r^{th}$ target image of hidden node i, j.

The concatenated feature matrix may be obtained in accordance with the following Equation 4:

$$f^{x_{ij}} = [f^{x_i} f^{x_j}] \quad \text{[Equation 4]}$$

Figure 6:
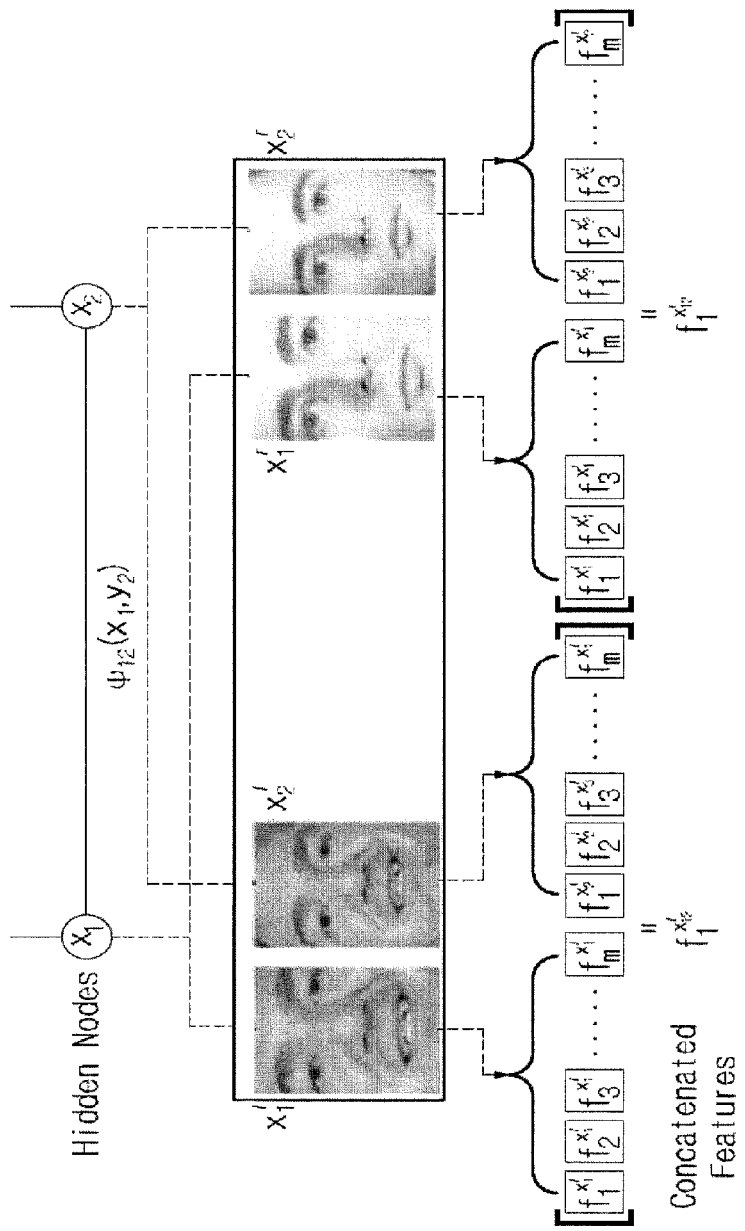
FIG. 6 is a view illustrating a concatenated feature between hidden nodes.

FIG. 6 is a view illustrating a concatenated feature between hidden nodes.

Referring to FIG. 6, m feature vectors are obtained from the $l^{th}$ target image of hidden nodes 1 and 2, and the $r^{th}$ target image of the hidden nodes 1 and 2. The $l^{th}$ target image of hidden node 1 and the $l^{th}$ target image of hidden node 2 are represented by $f^{x_{12}^l}$. The $r^{th}$ target image of hidden node 1 and the $r^{th}$ target image of hidden node 2 are represented by $f^{x_{12}^r}$. The face recognition apparatus according to one embodiment of the present invention more accurately obtains similarity, since it calculates the similarity while taking into consideration the similarity between target images, as shown in Equation 3.

Also, the second calculation unit 620 calculates a second relationship between target images, based on the second similarity calculated in accordance with Equation 3. The second relationship function may be represented by the following Equation 5:

$$\psi_{ij}(x_i, x_j) = \exp(-|s_{ij}(x_i, x_j) - 1|^2 / 2\sigma^2) \quad \text{[Equation 5]}$$

wherein the second relationship function, $\psi_{ij}(x_i, x_j)$, has an n×n matrix form, $\sigma$ is a noise parameter, and $s_{ij}(x_i, x_j)$ is a function representing a second similarity.

The identification unit 630 determines whether or not target images corresponding to face images to be identified are present in the storage unit 400. That is, the identification unit 630 determines whether or not a subject in need of identification is a person who is registered in a database of the face recognition apparatus using the calculation result of the first calculation unit 610 and the calculation result of the second calculation unit 620.

The identification unit 630 draws solutions from a Markov network or Markov random field (MRF). In one embodiment, a belief propagation algorithm may be used.

A belief propagation algorithm is a message-passing method for inferring graphic models of a Markov network. As described above, in a case of using three observed nodes, a message-passing function may be represented by the following Equation 6:

$$m_{12}(x_2) = \sum_{x_j} \psi_{12}(x_1, x_2) \prod_{k \neq 2} m_{k1}(x_1) \phi_1(x_1, y_1) \quad \text{[Equation 6]}$$

$$= \sum_{x_j} \psi_{12}(x_1, x_2) \phi_1(x_1, y_1)$$

$$m_{23}(x_3) = \sum_x \psi_{23}(x_2, x_3) \prod_{k \neq 3} m_{k2}(x_2) \phi_2(x_2, y_2)$$

$$= \sum_{x_j} \psi_{23}(x_2, x_3) \prod \overline{m}_{12}(x_2) \phi_2(x_2, y_2)$$

$$m_{32}(x_2) = \sum_{x_j} \psi_{32}(x_3, x_2) \prod_{k \neq 2} m_{k3}(x_3) \phi_3(x_3, y_3)$$

$$= \sum_{x_j} \psi_{32}(x_3, x_2) \phi_3(x_3, y_3)$$

$$m_{21}(x_1) = \sum_{x_j} \psi_{21}(x_2, x_1) \prod_{k \neq 1} m_{k2}(x_2) \phi_2(x_2, y_2)$$

$$= \sum_{x_j} \psi_{21}(x_2, x_1) \prod \overline{m}_{32}(x_2) \phi_2(x_2, y_2)$$

wherein $m_{ij}(x_j)$ is an element of vector corresponding to the target image $x_j$.

Also, marginal probability $b_i$ of the hidden node $x_i$ may be obtained in accordance with the following Equation 7:

$$b_1(x_1) = \prod_k m_{k1}(x_1) \phi_1(x_1, y_1) \quad \text{[Equation 7]}$$

$$= \prod m_{21}(x_1) \phi_1(x_1, y_1)$$

$$b_2(x_2) = \prod_k m_{k2}(x_2) \phi_2(x_2, y_2)$$

$$= \prod m_{12}(x_2) m_{32}(x_2) \phi_2(x_2, y_2)$$

$$b_3(x_3) = \prod_k m_{k3}(x_3) \phi_3(x_3, y_3)$$

$$= \prod m_{23}(x_3) \phi_3(x_3, y_3)$$

Figure 7:
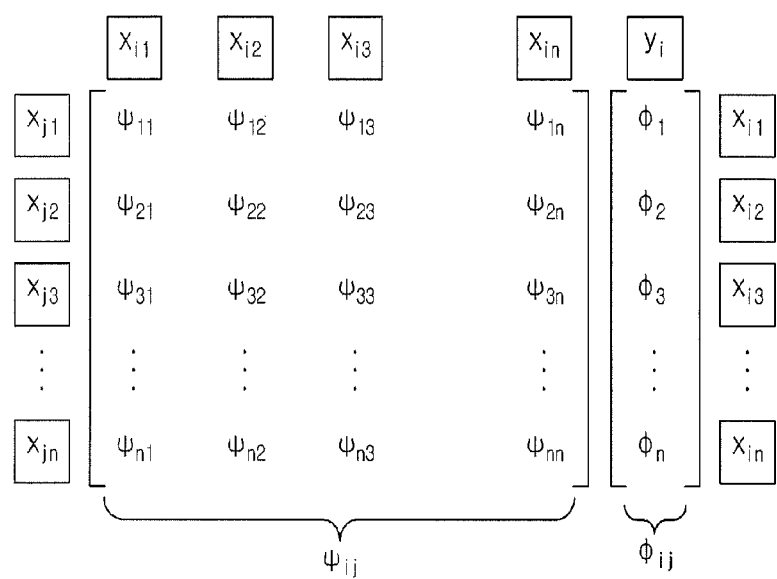
FIG. 7 shows a relationship between nodes represented by Equation 7.

FIG. 7 shows a relationship between nodes corresponding to Equation 7 above.

Referring to FIG. 7, as described above, $\psi_{ij}(x_i, x_j)$ refers to a function representing the second relationship between the target images of the hidden node i and the hidden node j, and is in the form of a n×n matrix. When $\psi_{ij}(x_i, x_j)$ is multiplied by a first relationship function $\phi_i(x_i, y_i)$, representing a relationship between the observed node I and the hidden node, a marginal probability function may be obtained through matrix calculation.

Also, the identification unit 630 may calculate a final similarity in accordance with the following Equation 8 using a weighted summation method:

$$z = w_1 b_1 + w_2 b_2 + w_3 b_3$$

Weights w1, w2 and w3 of respective nodes may be predetermined by a user. When the final similarity value meets or exceeds a predetermined reference level, it is estimated that the target image corresponding to the face image to be identified is stored in the storage unit 400. That is, a subject in need of identification is considered to be a person stored in the database of the face recognition apparatus.

Also, the face recognition apparatus may output face recognition results or identification results in a visual or auditive manner through a display unit, speaker, or an output unit provided in the face recognition apparatus.

As described above, in one embodiment of the present invention, implementing face recognition using a Markov network, first similarity, second similarity or the like is calculated using feature vectors of face images. Hereinafter, operations of a feature extraction unit 500 according to one embodiment of the present invention will be described in detail.

Figure 8:
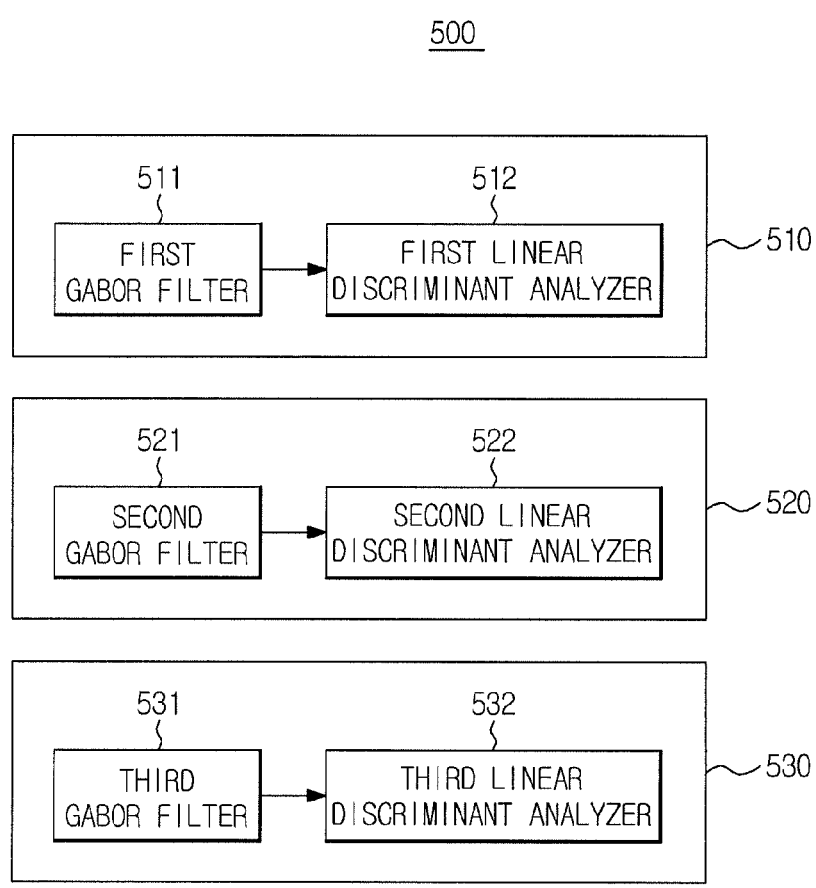
FIG. 8 is a block diagram illustrating a detailed configuration of a feature extraction unit 500 according to one embodiment of the present invention.

FIG. 8 is a block diagram illustrating a detailed configuration of the feature extraction unit 500 according to one embodiment of the present invention.

The feature extraction unit 500 includes a first extraction unit 510, a second extraction unit 520 and a third extraction unit 530, and each extraction unit 510, 520 or 530 includes a Gabor filter 511, 521 or 531, and a linear discriminant analyzer 512, 522 or 532, respectively.

The feature extraction unit 500 receives a first sub-image S1, a second sub-image S2 and a third sub-image S3 generated by the sub-image production unit 300. At this time, the first extraction unit 510 receives the first sub-image S1, the second extraction unit 520 receives the second sub-image S2, the third extraction unit 530 receives the third sub-image S3 and each extraction unit extracts a feature of the received sub-image.

More specifically, respective Gabor filters 511, 521 and 531 project extended curvature Gabor filters (extended curvature Gabor classifier bunch) having different features to the corresponding sub-images to produce features.

The features of extended curvature Gabor filters depend on the parameters of the Gabor filters and are grouped according to the features of Gabor filters.

More specifically, the features of extended curvature Gabor filters depend on parameters such as orientation (μ), scale (v), Gaussian width (σ) and curvature ratio (c) of the Gabor filters, and features of the Gabor filters having an identical orientation and features of the extended curvature Gabor filters having an identical scale may be grouped according to combinations of Gaussian width and curvature ratio.

For example, when seven scales (v) and eight orientations (μ) are used, 56 (7×8) extended curvature Gabor filters having different features can be obtained. In this case, when three Gaussian widths (σ) and four curvature ratios (c) are used, twelve (3×4) Gabor filters having different features can be further obtained.

Accordingly, when the Gaussian width (σ) and curvature ratio (c) of respective extended curvature Gabor filters are changed as shown below, extended curvature Gabor filters (7×16×3×3+7×8×3=1,1760) which are more extended than original Gabor filters (e.g., 5×8=40) may be obtained and they are projected to the corresponding sub-images and thus exhibit different features:

$$\left( = \underbrace{\underbrace{7 \times 16 \times 3 \times 3}_{v \quad \mu \quad \sigma \quad c \neq 0} + \underbrace{7 \times 8 \times 3}_{v \quad \mu \quad \sigma}}_{c=0} \right)$$

Accordingly, respective Gabor filters 511, 521 and 531 may use less or more extended curvature Gabor filters by controlling parameters having different values (e.g., the orientation μ, scale v, Gaussian width σ and/or curvature ratio c).

At this time, optimum extended curvature Gabor filters may be found through adaptive boosting (e.g., using an algorithm such as adaboost). Otherwise, a boost learning method such as GentleBoost, realBoost, KLBoost or JSBoost may be used, for example. By selecting Gabor features from respective sub-images using one or more of the above boost learning methods, it is possible to improve recognition efficiency of subject images.

A calculation task required for face recognition may be reduced since optimum features are selectively extracted using a boosting algorithm.

The respective Gabor filters 511, 521 and 531 produce features of corresponding sub-images using an I-type extended curvature Gabor filter (I-type extended curvature Gabor classifier bunch), which will be described with reference to FIGS. 9 and 10.

Figure 9:
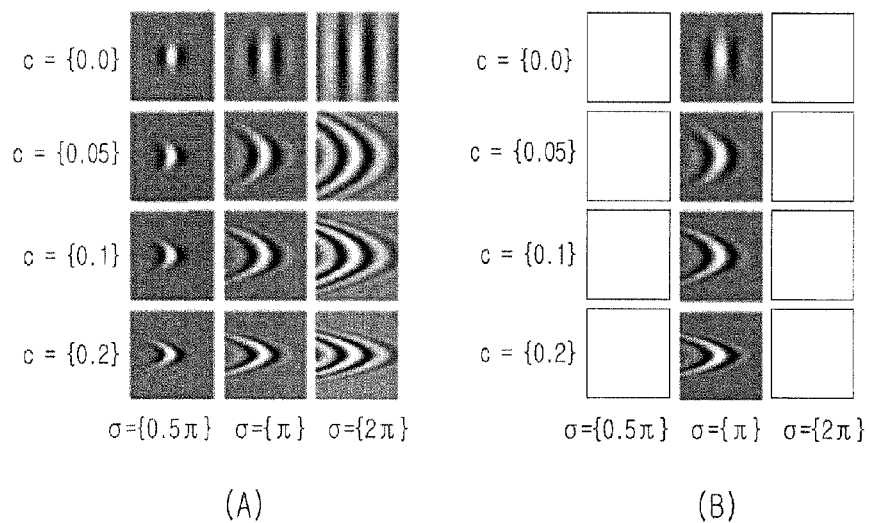
FIG. 9 parts (A) and (B) illustrate an example of I-type extended curvature Gabor filter (I-Type Extended Curvature Gabor Classifier Bunch) groups.

FIG. 9 illustrates an example of I-type extended curvature Gabor filter (I-Type Extended Curvature Gabor Classifier Bunch) groups and FIG. 10 illustrates an example of features of a curvature Gabor filter.

As shown in FIG. 9 part (A), one I-type extended Gabor filter group includes twelve curvature Gabor filters, i.e., G={g(σ1, c1), g(σ2, c2), g(σ3, c3), g(σ4, c4), g(σ5, c5), ..., g(σ12, c12)}, having three Gaussian widths (σ) and four curvature ratios (c). As shown in FIG. 9A, one or more parameters may be selected to have a plurality of values. For example, the curvature ratio (c) has four values in which c={0.0, 0.05, 0.1, 0.2} and the Gaussian width (σ) has three values in which σ={0.5π, π, 2π}).

In one I-type extended Gabor filter group, as shown in FIG. 9 part (B), the curvature ratio c has four values of {0.0, 0.05, 0.1, 0.2} and the Gaussian width has a value of σ={π} among the three values of σ (σ={0.5π, π, 2π}).

As such, twelve curvature Gabor filters have eight orientations as shown in FIG. 10 part (A) when the curvature ratio c is {0.0} (that is, a straight line), and have sixteen orientations of μ={0, 1, 2, ..., 15}, as shown in FIG. 10 part (B), when a curvature ratio c is higher than {0.0} (that is, a curvature exists, e.g., c=0.1).

The I-type extended curvature Gabor filter group arrays twelve curvature Gabor filters in a column based on curvature ratio (c) and in a row based on Gaussian width (σ). For example, filtering may be performed using four curvature Gabor filters constituting the I-type extended curvature Gabor filter, as shown in FIG. 9B.

For example, four I-type curvature Gabor filters may include four curvature Gabor filters that have curvature ratios c of {0, 0.05, 0.1, 0.2}, when Gaussian width σ is {π}.

Accordingly, it is possible to obtain a predetermined level or higher of a face recognition ratio, as well as considerably reduce a calculation task, especially when compared to a case of using all twelve curvature Gabor filters. Therefore, an increase in speed and secure face recognition performance due to low dispersion may be achieved.

When features of curvature Gabor filters are grouped as described above, it is possible to reduce the dimension of input values for the subsequent linear discriminant analysis (LDA) operation and thus easily expend curvature Gabor filters.

For example, although the number of features of face images is increased and the number of used curvature Gabor filters is thus increased by changing Gaussian width and curvature ratio, when the dimension of input values is reduced by grouping the features, the load of linear discriminant analysis (LDA) learning can be reduced. Also, this is useful for improving efficiency of LDA learning.

Respective linear discriminant analyzers 512, 522 and 532 perform linear discriminant analysis (LDA) operations using I-type extended curvature Gabor filter groups as input vales.

The linear discriminant analyzers 512, 522 and 532 independently perform an LDA operation on each operation I-type extended curvature Gabor filter group.

Each linear discriminant analyzer 512, 522 or 532 may include a plurality of linear discriminant analysis processors (not shown) and each linear discriminant analysis processor may perform an LDA operation on one I-type extended curvature Gabor filter group.

Respective linear discriminant analyzers 512, 522 and 532 output a plurality of linear discriminant analysis results (that is, basis vectors) from one sub-image and project features of I-type extended curvature Gabor filter groups to respective sub-images to produce feature vectors.

The feature extraction unit 500 of the present embodiment may produce about 2400 features from one sub-image.

The reason for production of about 2400 features is that the time taken for production of about 2400 features is less than two times the time taken for production of about 1400 features and the production of about 2400 features exhibits high performance and low dispersion, as compared to the production of about 1400 features. This is demonstrated through experimentation.

Figure 11:
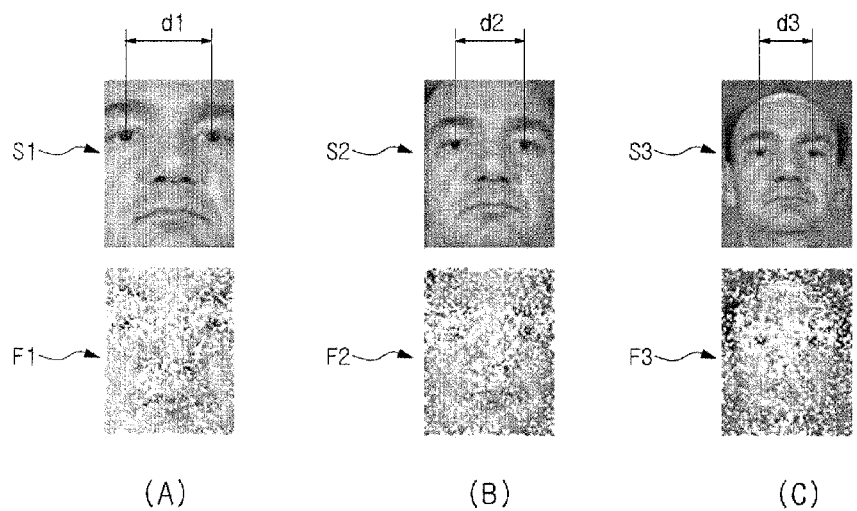
FIG. 11 parts (A), (B), and (C) illustrate feature images produced through curvature Gabor filtering and linear discriminant analysis of sub-images.

As shown in FIG. 11, when respective sub-images S1, S2 and S3 are subjected to curvature Gabor filtering and linear discriminant analysis (LDA), face images having a plurality of features are produced.

As shown in FIG. 11 part (A), when a first sub-image S1 having a distance d1 between two eyes is subjected to curvature Gabor filtering and linear discriminant analysis, a first feature image (F1) is produced. As shown in FIG. 11 part (B), when a second sub-image S2 having a distance d2 between two eyes is subjected to curvature Gabor filtering and linear discriminant analysis, a second feature image (F2) is produced. As shown in FIG. 11 part (C), when a second sub-image S3 having a distance d3 between two eyes is subjected to curvature Gabor filtering and linear discriminant analysis, a third feature image (F3) is produced.

Linear discriminant analysis (LDA) is a method used for learning to linearly project data to sub-regions to reduce within-class scatter and maximize between-class scatter.

Otherwise, principal component and linear discriminant analysis (PCLDA) or principal component analysis may be used.

Figure 12:
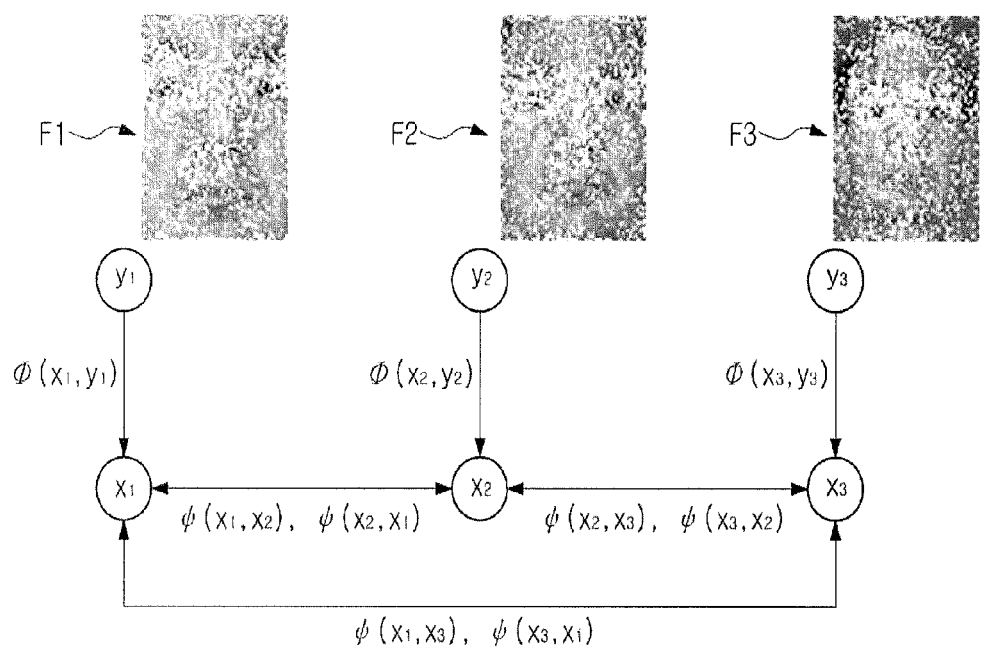
FIG. 12 is a view of a Markov network to which feature images are applied.

Also, as shown in FIG. 12, vectors input to the observed nodes of Markov network may be regarded to be respective feature vectors obtained from first, second and third feature images.

Hereinafter, a method for controlling the face recognition apparatus according to one embodiment of the present invention will be described.

Figure 13:
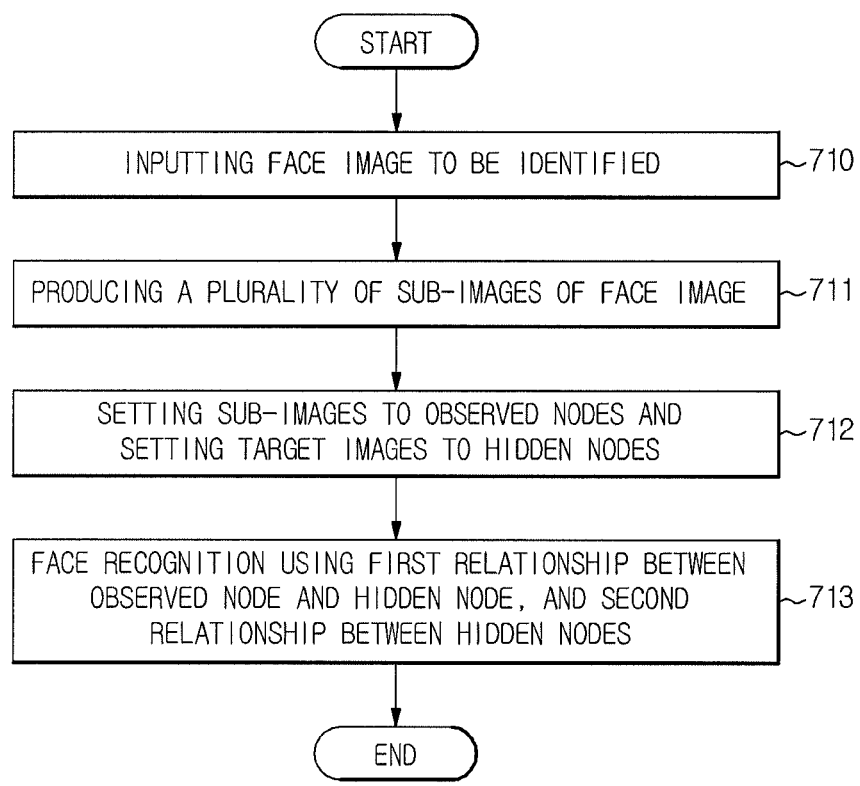
FIG. 13 is a flowchart illustrating a method for controlling the face recognition apparatus according to one embodiment of the present invention.

FIG. 13 is a flowchart illustrating a method for controlling the face recognition apparatus according to one embodiment of the present invention.

Referring to FIG. 13, first, a face image to be identified is input from an image input unit (710). Here, the input target is an image including the face of a subject in need of identification and is not limited to the face but may include surrounding images (e.g. a background portion or peripheral face imagery).

Also, a plurality of sub-images of the input face image may be produced using a plurality of different face models (711). The face model applicable to the embodiments is not limited. In one embodiment, the distance between two eyes is calculated based on eye coordinates and the calculated distance between two eyes is controlled to enable application of an interior face model, a compensated face model, and an exterior face model that have an identical size, but different analysis ranges.

Also, using a Markov network, the plurality of sub-images are set to observed nodes of the Markov network and the plurality of target images are set to hidden nodes of the Markov network (712).

Using a first relationship between the observed node and the hidden node, and a second relationship between the hidden nodes, the target image corresponding to the face image to be identified is recognized (713).

The first relationship is based on the similarity between sub-images and target images and this similarity may be obtained in accordance with Equation 1 described above. Also, the first relationship may be obtained in accordance with Equation 2 described above.

Also, the second relationship is based on the similarity between target images and this similarity may be obtained in accordance with Equation 3 described above. Also, the second relationship may be obtained in accordance with Equation 5 described above.

The recognition of the target image corresponding to the face image to be identified will be described in more detail. When the first relationship and the second relationship are obtained using Equations 2 and 5, a belief propagation algorithm may be applied thereto. The application results of the belief propagation algorithm may be represented by Equation 6 described above.

A marginal probability may be calculated based on the application result of the belief propagation algorithm and the first relationship, as shown in Equation 7. A final similarity may be calculated using marginal probabilities calculated from respective nodes and weights of respective nodes, and the target image corresponding to the face image to be identified is determined to be present, when the final similarity is equal to or greater than a predetermined reference value. That is, the subject in need of identification is considered to be a person registered in the database of the face recognition apparatus when the final similarity is equal to or greater than the predetermined reference value.

In the face recognition apparatus and method for controlling the same according to the above-described embodiments, it is possible to improve accuracy of face recognition results by performing face recognition, while taking into consideration a relationship between hidden nodes, that is, a similarity between target images, using a Markov network.

Further, it is possible to provide a face recognition apparatus that is independent of internal environmental variation such as identity, age, race, expression and accessories and external environmental variation such as pose, exterior illumination and image processing in face images and target images of a subject in need of identification.

Further, it is advantageously possible to considerably reduce a processing time, reduce the number of feature values and reduce the storage area required for extracting or comparing features of the face. Also, it is advantageously possible to realize a face recognition system that is well driven even under low hardware specifications.

The apparatus and method for performing face recognition of an input image according to the above-described example embodiments may use one or more processors, which may include a microprocessor, central processing unit (CPU), digital signal processor (DSP), or application-specific integrated circuit (ASIC), as well as portions or combinations of these and other processing devices.

The terms "module", and "unit," as used herein, may refer to, but are not limited to, a software or hardware component or device, such as a Field Programmable Gate Array (FPGA) or Application Specific Integrated Circuit (ASIC), which performs certain tasks. A module or unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

The method for performing face recognition of an input image according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Each block of the flowchart illustrations may represent a unit, module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Although a few example embodiments of the present invention have been shown and described, it would be appreciated by those skilled in the art that changes may be made to these embodiments without departing from the principles and spirit of the invention, the scope of which is defined in the claims and their equivalents.

What is claimed is:

1. A face recognition apparatus comprising:
an image input unit to receive an image of a face to be identified;
a sub-image production unit to produce a plurality of sub-images of the input face image using a plurality of different face models; and
a face recognition unit to set the sub-images to observed nodes of a Markov network, to set target images to hidden nodes of the Markov network using the Markov network, and to recognize the presence of a target image corresponding to the face image to be identified using a first relationship between the observed nodes and the hidden nodes and a second relationship between the hidden nodes.

2. The face recognition apparatus according to claim 1, further comprising a storage unit to store the plurality of target images.

3. The face recognition apparatus according to claim 2, wherein the first relationship between the observed node and the hidden node is based on a similarity between the sub-image and the target image, and
the second relationship between the hidden nodes is based on a similarity between the target images.

4. The face recognition apparatus according to claim 3, wherein the face recognition unit comprises:
a first calculation unit to calculate a first similarity between the respective sub-images produced in the sub-image production unit and the target images stored in the storage unit and to array the target images in a predetermined order; and
a second calculation unit to calculate a second similarity between target images arrayed with respect to one sub-image among the sub-images, and target images arrayed with respect to at least one other sub-image among the sub-images.

5. The face recognition apparatus according to claim 4, wherein the target images are arrayed in an order based on a similarity from a high similarity to a relatively lower similarity.

6. The face recognition apparatus according to claim 4, wherein the second calculation unit calculates the second similarity from all sub-images produced by the sub-image production unit.

7. The face recognition apparatus according to claim 4, wherein the first calculation unit calculates the first relationship in accordance with the following Equation 2:

$$\phi_i(x_i,y_i)=\exp(-|s_i(x_i,y_i)-1|^2/2\sigma^2) \qquad \text{[Equation 2]}$$

wherein $x_i$ and $y_i$ are a target image i and a sub-image i, respectively, $\phi(x_i, y_i)$ is a vector function representing a first relationship between the sub-image i and the target image i, $s(x_i,y_i)$ represents a first similarity between the target image i and the sub-image i, and $\sigma$ represents a noise parameter.

8. The face recognition apparatus according to claim 4, wherein the second calculation unit calculates the second relationship in accordance with the following Equation 5:

$$\psi_{ij}(x_i,x_j)=\exp(-|s_{ij}(x_i,x_j)-1|^2/2\sigma^2) \qquad \text{[Equation 5]}$$

wherein $x_i$ and $x_j$ are a target image i and a target image j, respectively, is a matrix function representing a second relationship between the target image i and the target image j, $s(x_i, x_j)$ represents a second similarity between the target image i and the target image j, and $\sigma$ represents a noise parameter.

9. The face recognition apparatus according to claim 7, further comprising:
an identification unit to detect the target image corresponding to the face image to be identified by applying a belief propagation algorithm to the first relationship and the second relationship.

10. The face recognition apparatus according to claim 8, further comprising:
an identification unit to detect the target image corresponding to the face image to be identified by applying a belief propagation algorithm to the first relationship and the second relationship.

11. The face recognition apparatus according to claim 9, wherein the identification unit calculates a marginal probability based on the application result of the belief propagation algorithm and the first relationship, and detects the target image corresponding to the face image to be identified based on the calculated marginal probability.

12. A method for controlling a face recognition apparatus, the method comprising:
inputting a face image to be identified;
producing a plurality of sub-images of the input face image using a plurality of different face models;
setting the sub-images to observed nodes of a Markov network and setting target images to hidden nodes of the Markov network using the Markov network; and
recognizing a target image corresponding to the face image to be identified using a first relationship between the observed node and the hidden node and a second relationship between the hidden nodes.

13. The method according to claim 12, wherein the first relationship between the observed node and the hidden node is based on a similarity between the sub-image and the target image, and
the second relationship between the hidden nodes is based on a similarity between the target images.

14. The method according to claim 13, wherein the recognizing a target image corresponding to the face image to be identified comprises:
calculating a first similarity between the respective sub-images produced in the sub-image production unit and the target images and arraying the target images in a predetermined order; and
calculating a second similarity between target images arrayed with respect to one sub-image among the sub-images, and target images arrayed with respect to at least one other sub-image among the sub-images.

15. The method according to claim 14 wherein the second similarity is calculated based on all the produced sub-images.

16. The method according to claim 15, wherein the first relationship is calculated in accordance with the following Equation 2:

$$\phi_i(x_i,y_i)=\exp(-|s_i(x_i,y_i)-1|^2/2\sigma^2) \quad \text{[Equation 2]}$$

wherein $x_i$ and $y_i$ are a target image i and a sub-image i, respectively, $\phi(x_i,y_i)$ is a vector function representing a first relationship between the sub-image i and the target image i, $s(x_i,y_i)$ represents a first similarity between the target image i and the sub-image i, and $\sigma$ represents a noise parameter.

17. The method according to claim 15, wherein the second relationship is Calculated in accordance with the following Equation 5:

$$\psi_{ij}(x_i,x_j)=\exp(-|s_{ij}(x_i,x_j)-1|^2/2\sigma^2) \quad \text{[Equation 5]}$$

wherein $x_i$ and $x_j$ are a target image i and a target image j, respectively, $\psi(x_i,x_j)$ is a matrix function representing a second relationship between the target image i and the target image j, $s(x_i, x_j)$ represents a second similarity between the target image i and the target image j, and $\sigma$ represents a noise parameter.

18. The method according to claim 16, wherein the recognizing a target image corresponding to the face image to be identified is carried out by applying a belief propagation algorithm to the first relationship and the second relationship.

19. The method according to claim 17, wherein the recognizing a target image corresponding to the face image to be identified is carried out by applying a belief propagation algorithm to the first relationship and the second relationship.

20. The method according to claim 18, wherein the recognizing a target image corresponding to the face image to be identified is carried out by calculating a marginal probability based on the application result of the belief propagation algorithm and the first relationship, and recognizing the presence of a target image corresponding to the face image to be identified, based on the calculated marginal probability.

21. A face recognition apparatus comprising:
an image input unit to receive an image;
a sub-image production unit to produce a plurality of sub-images of the input image using a plurality of models;
a feature extraction unit to receive the plurality of sub-images generated by the sub-image production unit and to extract at least one feature from each of the plurality of sub-images; and
a recognition unit to set the sub-images to observed nodes of a Markov network, to set target images to hidden nodes of the Markov network using the Markov network, and to recognize the presence of a target image corresponding to the image to be identified by using the extracted features to determine a first relationship between the observed nodes and the hidden nodes and by determining a second relationship between the hidden nodes.

22. The face recognition apparatus according to claim 21, wherein the feature extraction unit comprises a plurality of extraction units which correspond to the plurality of sub-images, each extraction unit including at least one Gabor filter to obtain a plurality of features and a linear discriminant analyzer to perform linear discriminant analysis on the obtained features to calculate a feature vector.

23. The face recognition apparatus according to claim 22, wherein each Gabor filter obtains a plurality of features using an I-type extended curvature Gabor filter group using at least one parameter from among parameters including orientation, scale, Gaussian width, or curvature ratio.

* * * * *

UNITED STATES PATENT AND TRADEMARK OFFICE
CERTIFICATE OF CORRECTION

PATENT NO. : 8,861,805 B2  
APPLICATION NO. : 13/666168  
DATED : October 14, 2014  
INVENTOR(S) : Won Jun Hwang et al.

Page 1 of 1

It is certified that error appears in the above-identified patent and that said Letters Patent is hereby corrected as shown below:

On the Title Page

On Page 2

Column 2, Item [56] (Other Publications), line 5, Delete "specifc" and insert -- specific --, therefor.

In the Claims

Column 18, Line 5, In Claim 17, delete "Calculated" and insert -- calculated --, therefor.
Column 18, Line 8, In Claim 17, delete "$x_i$" and insert -- $x_j$ --, therefor.

Signed and Sealed this  
Second Day of June, 2015

Michelle K. Lee  
*Director of the United States Patent and Trademark Office*